UNITED STATES PATENT OFFICE.

ALEXANDER H. EGE, OF MECHANICSBURG, PENNSYLVANIA.

ARTIFICIAL FUEL.

1,357,627.  Specification of Letters Patent.  Patented Nov. 2, 1920.

No Drawing.  Application filed May 12, 1919. Serial No. 296,523.

*To all whom it may concern:*

Be it known that I, ALEXANDER H. EGE, a citizen of the United States, residing at Mechanicsburg, in the county of Cumberland and State of Pennsylvania, have invented certain new and useful Improvements in Artificial Fuel, of which the following is a specification.

This invention relates to a fuel and has for its object the production of a fuel which utilizes powdered fuel of all kinds, such as coke, braize, culm, slack, powdered lignite, saw-dust, soot, and powdered fuel generally.

In my Patent No. 1,130,075, granted to me March 2, 1915, I have disclosed and claimed patent protection for an artificial fuel consisting of soot, chlorid of sodium, cement and water. The chlorid of sodium is present in small quantity and for the purpose of enabling the soot, which forms the combustible part of the mixture, to unite readily with the water. In other words, the salt or the sodium chlorid has the effect of leading in the water or enabling the water to emulsify or mix with the soot.

The present invention is an improvement upon the invention of the previous patent in that I use a substance which unites with or responds to the salt in a cementitious or cementitious manner and thus aids both in stiffening and holding together the whole product and conferring additional calorific power. The substance which I prefer to use is a magnesium compound capable of forming a cement, and I may supplement the salt or sodium chlorid mentioned, or replace it in part by a proportion of magnesium chlorid. This enables me to form a magnesium oxychlorid cement in the mass and the salt thus has a double function; first in enabling the braize, slack, or other fuel to be thoroughly emulsified, and second in enabling the compound to be formed with the chlorid. Of course instead of magnesium, chlorid and oxid, calcium chlorid and calcium oxid may be used, though calcium formed cement is not as good as the magnesium, and other substances may be used if desired. The salt may in part, be replaced by the hydrate of an alkali metal or alkali earth metal, the alkali having the power to render hydrocarbons emulsifiable though not uniting with them to produce saponification. The part then, which the salt plays, or the substitute alkaline hydrate, is to render the oily fuel—and most of the powdered fuels are oily and combined with a considerable portion of hydro-carbon—emulsifiable or readily miscible with the cement-forming constituents by the aid of water. I add in a proportion of coke braize or slack.

The product thus formed is shaped into briquets before the cement has time to set and the briquets thus formed are then dried, when they will be found to be exceedingly durable, slightly porous and hard and resonant. The coke braize or slack is practically neutral but it serves as a carrier for the cement constituents and also as a diluent. In other words it serves the same purpose as sand and gravel when mixed with the ordinary cement in concrete pave or block work, and also has an additional function, the capability of being burned as a fuel.

By the means that I have indicated, namely, by using coke braize or slack to mix with and spread the cement, both the Portland cement which I may use in addition to the magnesium oxychlorid or other similar cement, and by using the salt to aid in leading the water into the rebellious non-miscible or reluctantly miscible oily or greasy fuel powder, I am enabled to make a very little cement go very far in building up a briquet.

The art of producing fuel briquets of the proper character is beset with many difficulties. Almost any fuel when mixed with a tarry hydro-carbon can be molded into a briquet. Some fuels can be molded under great pressure without any additional ingredients. This is true of soft bituminous coal. When all these things, however, are done to constitute said fuel, while burning they melt together and form a cake in the interior of the furnace or fire-pot particularly when used for domestic purposes, and this cake has to be broken up by stoking before air can pass through and the fuel burn freely. In the meantime the fire smokes terribly.

That is the objection to a tarry binder. When it comes to a non-combustible binder, such as cement, clay, lime, etc., it is easy to produce a briquet which will stand up in burning, that is which will not melt together with others; but such briquets are open to the objection frequently, that they produce too great a quantity of ash. This ash clings to the exterior of the burning briquet and prevents free access of air and free burning and is objectionable on account of its weight and diminution of heating power and for other reasons.

I have produced here a briquet, however, in which the proportion of the slack or coke braize fuel with reference to the proportion of binder is very large indeed, so that the fuel stands up freely during the combustion until it is completely consumed, the quantity of ash depending almost entirely upon the ash in the powdered fuel which I use—that of the binders being negligible. Now some of these fuels, as for instance, soot, has practically no ash. Other fuels, such as anthracite slack or culm, are very free from ash because the slaty and non-combustible mineral parts of the natural fuel are largely non-existent in the said coal-ingredients.

The proportions which I use vary, of course, in accordance with the material which I employ. One example is given here, mainly for illustrative purposes, as follows:

| | |
|---|---|
| Coke braize or slack | 128 lbs. |
| Portland cement | 9 lbs. |
| A suitable chlorid | 1 lb. |
| Magnesium oxid | ⅛ lb. |

With this I mix a ton, more or less, of any of the ordinary powdered fuels mentioned above, namely, powdered lignite, culm, slack, etc. A sufficient amount of water should be added to the chlorid to enable it to mix with and carry the coke braize or slack, and the magnesium should not be added until this has been done and until the fuel powder is about to be mixed with them. As soon as the fuel is mixed—it is mixed into a rather stiff dough—it should be molded and allowed to set. The hydrocarbons in the fuel act somewhat as retarders to the setting of the cements, but the sooner the final product is given its ultimate shape the better.

These briquets, when dry, may be treated with petroleum in the proportion of five gallons to the ton of briquets. As an alternative, the petroleum may be mixed with the fuel and the whole mixed together if the cement shall have priorly been excluded. The petroleum being included in the mass will not readily evaporate. This fuel should be burnt with free access of air. Otherwise it is liable to smoke.

Having thus described my invention, what I claim as new and desire to secure by Letters Patent, is:

An artificial fuel consisting of powdered fuel, coke braize bonded with a relatively small proportion of a binder composed of Portland cement, oxychlorid cement and salt, all mixed and hydraulically set and having petroleum incorporated therewith.

In testimony whereof I have hereunto set my hand.

ALEXANDER H. EGE.